UNITED STATES PATENT OFFICE.

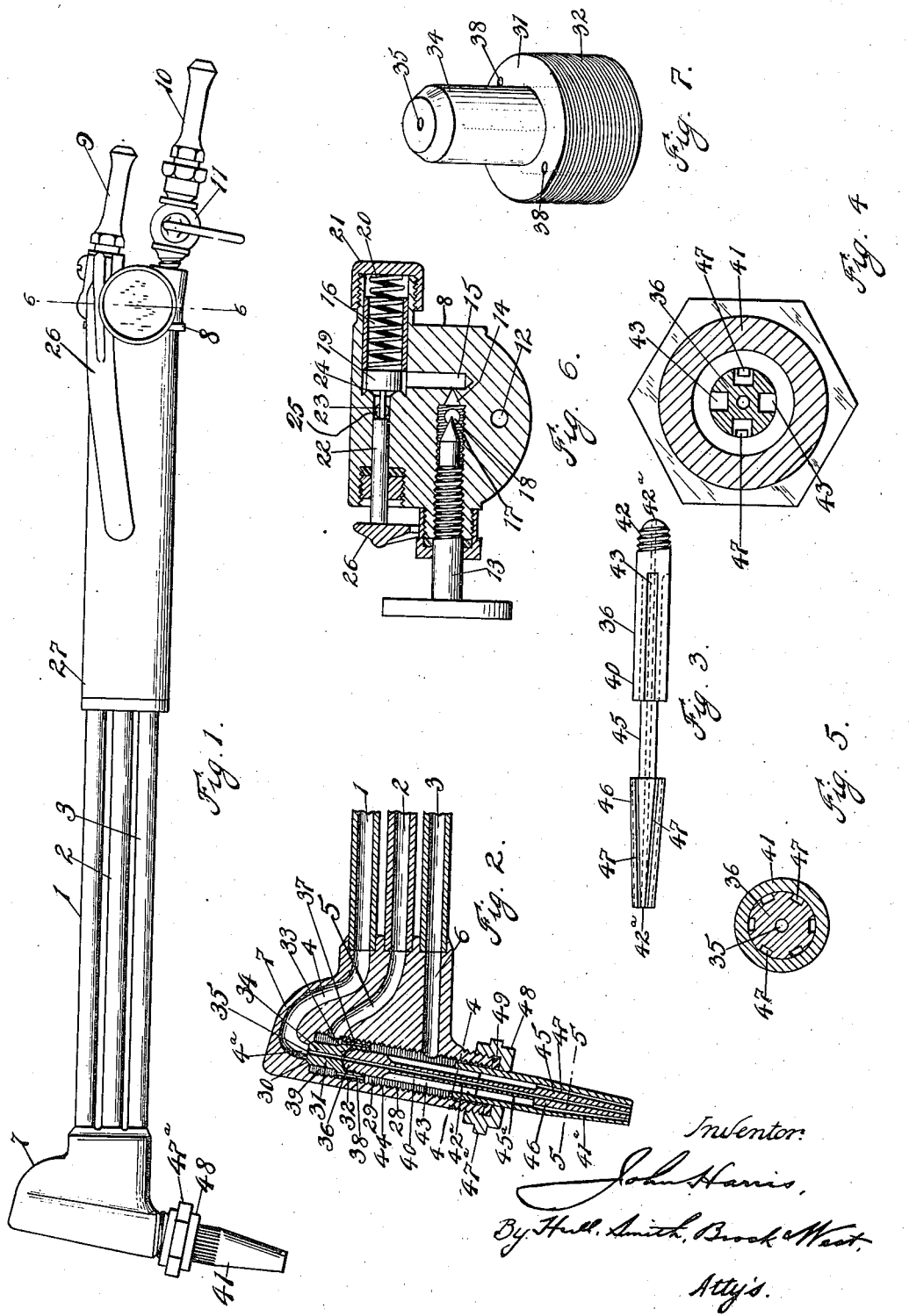

JOHN HARRIS, OF CLEVELAND, OHIO, ASSIGNOR TO CARBO-HYDROGEN COMPANY OF AMERICA, OF PITTSBURGH, PENNSYLVANIA, A CORPORATION OF DELAWARE.

TORCH.

1,258,769.  Specification of Letters Patent.  Patented Mar. 12, 1918.

Application filed June 5, 1916. Serial No. 101,665.

*To all whom it may concern:*

Be it known that I, JOHN HARRIS, a citizen of the United States, residing at Cleveland, in the county of Cuyahoga and State of Ohio, have invented a certain new and useful Improvement in Torches, of which the following is a full, clear, and exact description, reference being had to the accompanying drawings.

This invention relates to torches or blowpipes that are employed for the purpose of cutting and welding with gases and has for its general object to provide a torch of this character which shall be highly efficient in operation and wherein the parts comprising the head and tip may be conveniently assembled and disassembled and tips of varying capacity may be readily applied to and removed from the head; to provide a coöperating construction of head, tip and injector whereby the injector for the oxygen which is mingled with the combustible gas is carried in the main bore of the head itself; also to provide a coöperating construction of head and tip whereby the gases employed in the outlet may be manipulated and mixed in an effective and convenient manner and without liability to "flash back" and wherein it is practically impossible for such flashing back to extend beyond the head and, in fact, to the full depth of the main bore of the head; also to provide a torch wherein the same tip may be used efficiently for both cutting and welding purposes.

In the drawings forming part hereof, Figure 1 represents a side elevation of a torch constructed in accordance with my invention aforesaid; Fig. 2 a central longitudinal section taken through the head and tip and portions of the supply pipes adjacent thereto; Fig. 3 a detail in elevation of the inner member of the tip; Figs. 4 and 5 sectional details corresponding respectively to the lines 4—4 and 5—5 of Fig. 2; Fig. 6 a detail in section corresponding substantially to the line 6—6 of Fig. 1; and Fig. 7 a detail in perspective of the controlling and injecting plug.

Describing by reference characters the various parts illustrated herein, 1, 2 and 3 denote three tubes having at their front or delivery ends the passageways 4, 5 and 6, respectively, provided in the rear portion of the torch head 7, these tubes conducting respectively oxygen for cutting purposes and oxygen and a combustible gas (such as hydrogen) for welding or preheating purposes. The pipes communicate at their rear ends with a block 8. This block has at its rear end a connection 9 for oxygen and a connection 10 for the combustible gas, the last mentioned connection being shown as provided with a valve 11 through which it may be placed in communication with a passageway 12 extending through the block and communicating with the pipe 3. 13 denotes a needle valve which is threaded into the block and which coöperates with the valve seat 14 from which there extends a passageway 15 communicating with a receiving chamber 16 with which the connection 9 in turn is in communication. The valve seat 14 merges with the chamber 17 which communicates with the passageway 18 in the block, said passageway 18 communicating at its front end with the pipe 2. In the inner end of the chamber 16 there is located a valve 19 which is normally seated by means of a spring 20 in said chamber, said spring extending between the valve and a screw cap 21. This valve has a stem 22 which extends through and across the block and is provided with a recessed portion 23 whereby the oxygen passing the seat 24 may flow through a passageway 25 into the pipe 1. An operating lever 26 which is pivoted to the block extends alongside of a casing 27 surrounding the tubes and the forward part of the block 8 and forming a handle for operating the torch.

It will be observed that the passageways 4, 5 and 6 are provided in a rear extension of the head 7, the passageway 4 being so arranged that its discharge portion 4ª is directed substantially axially of the hollow body or sleeve portion of said head. This sleeve portion is provided with a cylindrical bore or chamber 28 extending upwardly from the lower end thereof, said chamber being provided with a thread 29 and having a tapered seat 30 merging with the passageway 4ª. 31 denotes a hollow plug having a cylindrical threaded exterior 32 whereby it is adapted to be threaded into the bore of the head and being provided above such threaded portion with a shoulder 33 and a nipple projection 34 the upper end whereof coöperates with the seat 30. This plug is provided with a central restricted bore 35 which, when the plug is in place, is in axial alinement with the passageway 4ª and which communicates at its bottom with a recess 36, said recess being internally threaded, as shown at 37. Between the recess 36 and the outer threaded periphery, the plug is provided with a plurality of narrow passageways 38 extending therethrough and communicating at their upper ends with an annular chamber 39 surrounding the nipple projection 34 and with which the passageway 5 also communicates.

Coöperating with the head and the plug is a removable two-part tip said tip comprising an inner tubular member 40 and an outer shell 41 rigidly connected to the inner member, as by means of pins or screws (not shown), whereby the tip comprising said members may be applied to the head as a unitary device. The upper end of the inner tip member is threaded, as indicated at 42, whereby it may be secured within the recess 36, and is provided with a central bore 42ª registering with the bore 35 in the plug 31. The upper end of the inner tip member is formed into a cylindrical body. This cylindrical body extends downwardly and fits within the upper end of the nozzle shell 41 and is provided with a plurality of slots 43 the upper portions whereof communicate with the annular chamber 44 in the head extending therearound and which annular chamber communicates with the pipe 3 and the passageway 6. Below the cylindrical body 40, the inner tip member is reduced, the depth of the slots 43 being substantially equal to the amount of projection or overhang of the cylindrical body 40 beyond the reduced part 45 of the inner tip member therebeneath. At its lower end, the inner tip member is provided with a frusto-conical enlargement 46 which is adapted to fit snugly within and form a leak proof connection with the lower tapered or frusto-conical portion 41ª of the surrounding shell 41. This frusto-conical enlargement is provided with a plurality of narrow rectangular slits 47, such as shown, described and claimed in my copending application No. 877,649, filed December 17, 1914.

A gland nut 47ª is threaded onto the lower end of the head 7 with its cap 48 surrounding the tip member 41, there being a packing 49 interposed between cap portion and the lower end of the head.

With the parts constructed and arranged as illustrated and described, the operation will be readily understood. Combustible gas, such as hydrogen, may be supplied through the pipe 3, its flow being controlled by the valve 11, and will enter the chamber 44. By opening the valve 13, oxygen from the chamber 16 will flow through the pipe 2 into the chamber 39 and be injected through the narrow passageways 38 into the chamber 44, where it will be mixed with the combustible gas, and will pass through the slots 43 and the chamber 45ª, escaping through the narrow rectangular slits 47. The flame thus produced can be readily regulated by manipulation of the valves so as to be suitable for welding purposes; or it may be used for preheating metal for cutting purposes, in which case, after the preheating operation has proceeded to the desired extent, oxygen for cutting purposes will be admitted by pressing on the lever 26, which oxygen will flow through the pipe 1 and the passageways 4, 4ª, and 35 through the bore of the inner tip member.

Among the advantages of this construction, it will be noted that the plug 31 serves to throttle the oxygen supply for the cutting jet and also has an injector for the oxygen which is to be used for the preheating or welding mixture; also that this plug enables me to provide as a self-contained part of the head a suitable injector for the oxygen to be mingled with the combustible gas, without requiring the presence of any manually operable means other than the valves 13 and 19 associated either with the head or with the handle.

A further and great advantage of the hollow plug 31 and its coöperating relation with the main bore of the burner head is that it not only serves as an injector for the oxygen which is mingled with the combustible gas but directs the jets lengthwise of the bore and hence in the same direction as the flame; furthermore, should the flame "flash back" into the bore, it is practically impossible for it to pass through the restricted passageways in the plug and the plug thus serves as a barrier against further propagation of the flame.

Making the plug removable enables me to employ in the same head different plugs, having varying sizes of central and surrounding passageways.

In operating with certain kinds of combustible gases, this interchangeability is important as it enables the plug to be varied with the capacity of the tip employed.

Having thus described my invention, what I claim is:—

1. In a torch of the character described, the combination of a head having a bore and three vertically spaced passageways, a plug removably mounted in the upper portion of said bore, said plug having a central bore therethrough registering with the uppermost passageway in said head and forming a seat registering with the lower end of said passageway, there being a chamber extending around the upper portion of said plug and communicating with the intermediate passageway, the plug having heating oxygen passageways therethrough extending from the said chamber, a tip for said head having an inner tubular member provided with a central bore adapted to register with the central bore of the plug, said tip also comprising a shell surrounding the inner member, there being passageways extending through the delivery portion of the tip within the shell and surrounding the central bore, the said head being provided with a chamber communicating with the lowermost passageway therein and the passageways in the tip which surround the central bore communicating with said chamber.

2. In a device of the character described, the combination of a head having a bore, an upper passageway for heating oxygen and a lower passageway for combustible gas communicating with longitudinally spaced parts of said bore, and a third passageway for cutting oxygen communicating with the upper end of said bore, a plug removably applied to the upper part of said bore and having a projection coöperating with the upper end of said bore and with the last-mentioned passageway, said plug having a laterally extending body below said projection and located below the two uppermost passageways, said body being provided with a plurality of restricted passageways extending therethrough, and a tip comprising an inner tubular member and an outer shell connected thereto, said tip having a bore adapted to register with the central bore in the said plug and having its upper end threaded into the bottom of said plug, the upper portion of said inner member being of smaller diameter than the bore of the head whereby a chamber is provided therearound which chamber communicates with the lowermost passageway in the head, said tip having passageways communicating with the last mentioned chamber and arranged around the central bore of said inner member and within the surrounding shell thereof.

3. In a torch of the character described, the combination of a head having a longitudinally extending bore, an upper passageway for heating oxygen and a lower passageway for combustible gas communicating with longitudinally spaced parts of said bore, and a third passageway for cutting oxygen communicating with the upper end of said bore, an injector plug applied to the upper end of said bore and itself having a central bore communicating with the third passageway, there being a chamber extending around the upper portion of said plug and communicating with the first mentioned passageway, said plug having a body extending into engagement with the inner wall of the bore and provided with passageways therethrough surrounding the central passageway, and a tip removably applied to the bore of said head and having a central bore therethrough, the upper end of the tip coöperating with the plug, and the bore in said tip coöperating with the central bore in the plug, there being a chamber extending around the upper portion of the tip communicating with the lowermost passageway in the head and said tip having a plurality of passageways grouped about the central bore and communicating with the last mentioned chamber.

4. In a torch of the character described, the combination, with a head having an axial internally threaded bore, an upper passageway for heating oxygen and a lower passageway for combustible gas communicating with longitudinally spaced parts of said bore, and a third passageway for cutting oxygen communicating with the upper end of said bore, of a plug threaded into said bore and having an upper or inner extension of less diameter than said bore adapted to seat against the upper or inner end of said bore and having a central bore adapted to register with the third passageway in the head when so seated, said plug having in the body portion thereof below said projection a plurality of passageways, said body portion being below the first mentioned passageway in the head, and a tip secured to said head, said tip comprising an inner tubular member provided with a central bore adapted to register with the central bore of the plug, the upper portion of said inner member being of less diameter than the diameter of the bore of said head whereby a chamber may be provided therewith communicating with the lowermost passageway in the head, said tip member also comprising an outer nozzle member surrounding the tubular inner member and provided with a tapered or frusto-conical lower end, and the inner member being provided with a similar frusto-conical enlargement at its lower end fitting the interior of said nozzle member with the upper end of the nozzle member engaging the body of the inner member, the portion of the inner member between such nozzle-engaging portions being reduced in diameter and the upper nozzle engaging portion being provided with slots which discharge into the chamber communicating with the lowermost passageway in the head, the lower tapered enlargement of said inner member being provided with a plurality of restricted passageways extending therethrough and converging toward the central bore at the discharge end.

5. In a torch of the character described, the combination of a head having an axial internal threaded bore and an upper passageway for heating oxygen and a lower passageway for combustible gas communicating with longitudinally spaced parts of said bore, and a third passageway for cutting oxygen communicating with the upper end of said bore, a plug comprising a threaded body having a centrally reduced extension and a central bore therethrough, said plug being adapted to be threaded into the bore with its upper end abutting and seating against the junction of the bore of said head and the last mentioned passageway, the plug being provided with an internally threaded central chamber in its lower part and with a projection extending from said chamber and adapted to register with the third passageway in the head, the body of said plug below said projection being provided with a plurality of restricted passageways extending therethrough, and a tip comprising an inner tubular member having its upper end threaded whereby it may be screwed into the chamber in the bottom of the plug, the upper portion of said member extending downwardly beyond the lowermost passageway in the head and providing a chamber with the bore of said head and being provided in said chamber with slots which communicate with the chamber, the inner member being reduced in diameter below the bottoms of said slots and having at its lower end a frusto-conical enlargement, a nozzle member surrounding the lower portion of the said inner member and extending upwardly above the slots therein and engaging such slotted portion and the frusto-conical portion of said inner member, the inner member being provided with a central bore and having a plurality of narrow restricted passageways in the frusto-conical portion thereof, and means for forming a leak-proof joint between the upper end of the nozzle member and the lower end of the bore of said head.

6. In a torch of the character described, the combination, with a head having an axial bore therein and having a lateral passageway for combustible gas communicating with the lower portion of said bore, a passageway for oxygen to mingle with such gas also communicating with the upper portion of said bore, and a passageway for cutting oxygen communicating with the upper or inner end of said bore, of a regulating plug removably applied to said bore and having a central bore adapted and arranged to register with and form a continuation of the last mentioned passageway and a plurality of restricted passageways surrounding the central bore and coöperating with the second passageway in the head to supply oxygen from such second passageway into the part of the bore which communicates with the combustible fluid passageway therebelow, and a tip for said head having a central bore adapted to register with the central bore of the plug and provided with passageways surrounding the central bore and adapted to conduct the mixed gases from the chamber with which the lowermost passageway in the head communicates.

7. The combination with a head having an axial bore, a passageway for combustible gas communicating with the lower portion of said bore, a passageway for oxygen communicating with the upper portion of said bore and a passageway for cutting oxygen communicating centrally with the upper end of said bore, of a plug removably applied to said bore, said plug having a body adapted to engage the bore with the upper end of said plug seated at substantially the junction of the upper end of the bore and the passageway for cutting oxygen, said plug having a central bore therethrough registering with the cutting oxygen passageway and having a plurality of restricted passageways therethrough surrounding the central bore, there being a chamber formed between the upper part of said plug and the upper portion of the bore of said head and communicating with the other oxygen passageway, and a tip having a central bore adapted and arranged to register with and form a continuation of the central bore in the plug, there being a chamber provided between said tip and the lower portion of the bore of said head and with which the passageway for combustible fluid communicates, said tip having passageways surrounding the central bore and communicating with the last mentioned chamber, and means for removably securing the tip to the head with its central bore in operative relation to the central bore in the plug and with the passageways surrounding the central bore in said tip in operative relation to the last mentioned chamber.

8. In a torch of the character described, the combination, with a head having a passageway for cutting oxygen, a passageway for preheating oxygen and a passageway for combustible gas and a mixing chamber with which the last mentioned passageway communicates, of a removable controlling element having a central bore for oxygen coöperating with and forming a continuation of the cutting-oxygen passageway in the head and one or more passageways for preheating oxygen communicating with the corresponding passageway in the head, the last mentioned passageway or passageways being adapted to discharge into the mixing chamber of said head.

9. In a torch of the character described, the combination, with a head having a passageway for cutting oxygen, a passageway for preheating oxygen and a passageway for combustible gas and a mixing chamber with which the last mentioned passageway communicates, of a removable controlling element having a central bore for oxygen coöperating with the cutting-oxygen passageway in the head and forming a continuation thereof and also having one or more passageways for preheating oxygen communicating with the corresponding passageway in the head, the last mentioned passageway or pasageways being adapted to discharge into the mixing chamber of said head, and a tip removably applied to the head and having a central bore arranged to receive oxygen from the central bore in the plug and a plurality of passageways adapted to receive the mixture from the mixing chamber.

10. In a torch of the character described, the combination, with a head having a bore, a passageway communicating with the upper or rear end of the bore, and a passageway communicating with the bore in front of the first mentioned passageway, of an injector plug within said bore having a central passageway adapted to communicate with the first mentioned passageway in the head and having a plurality of restricted passageways surrounding the central passageway and arranged to receive gas supplied through the second passageway in the head, a tip coöperating with the lower or front portion of the bore in the head and having a central passageway adapted to coöperate with the central passageway in the injector plug and passageways surrounding the central passageways and conducting a mixture of the gas supplied through the restricted passageways in the injector plug with the gas supplied through a third passageway in the head.

11. In a torch of the character described, the combination, with a head having a bore extending upwardly from the bottom or front end thereof, a passageway extending from the upper or rear end of the bore, and a pair of longitudinally spaced passageways communicating with said bore, of an injector plug mounted in said bore, the upper end of said plug being adapted to seat against the top or rear of the bore, said plug having a central bore adapted to register with the first mentioned passageway in the head and having a plurality of restricted passageways surrounding the central bore and extending through the plug, and a tip coöperating with said bore and plug, the passageways through the plug serving as injectors for the gas supplied to the bore thereabove and also serving to prevent propagation of flame therethrough.

In testimony whereof, I hereunto affix my signature.

JOHN HARRIS.